Figure 1:
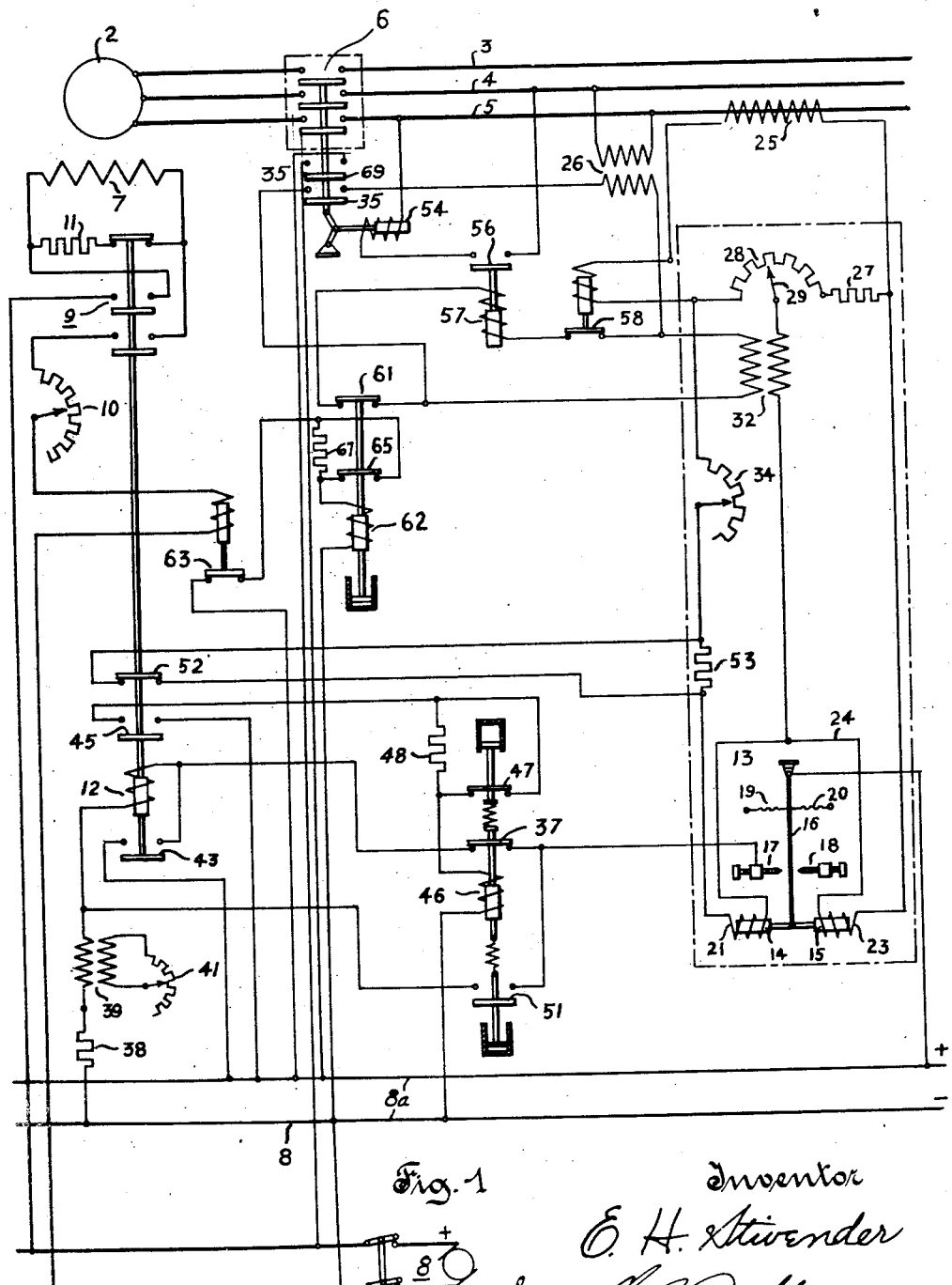

Oct. 27, 1942.   E. H. STIVENDER   2,299,771
SYNCHRONOUS MOTOR STARTER
Filed April 29, 1939   2 Sheets-Sheet 1

Inventor
E. H. Stivender
by [signature]
Attorney

UNITED STATES PATENT OFFICE 2,299,771

SYNCHRONOUS MOTOR STARTER

Edward H. Stivender, West Allis, Wis., assignor to Allis-Chalmers Manufacturing Company, Milwaukee, Wis., a corporation of Delaware Application April 29, 1939, Serial No. 270,859

8 Claims. (Cl. 172—289)

This invention relates to the control of electrical apparatus in response to characteristics of alternating current utilized, and the invention is of particular utility in the control of synchronous alternating current motors.

It has been customary practice heretofore to start a synchronous motor by placing the same in operation initially as an induction motor, the direct current field member being provided with a special closed circuit winding in which alternating current is induced during the starting operation. And the speed of the motor, during such operation as an induction motor, will build up and approach, but not reach, synchronous speed. Hence, it has been customary to connect the direct current field winding, either manually or automatically, to a source of direct current supply when the speed of the motor, during the starting operation, reaches a value of approximately 95% of synchronous speed, for the purpose of pulling the motor into synchronism and locking it there for normal operation at synchronous speed.

Synchronous motors may be started with the circuit of the direct current field winding open, at either one point or at several points, the latter condition providing for reduced voltage at the open circuit terminals of the field winding, or with the circuit of such field winding closed, usually through a resistance, and the resistance being wholly or substantially removed from the circuit on connecting the winding to the source of direct current, for pulling the motor into synchronism.

Prior practice in the matter of determining the proper instant for connecting, or effecting the connection of, the field winding to the source of direct current supply includes the use of devices responsive to the speed of the motor. Another prior method of effecting the synchronization of synchronous motors, of advantage more particularly where the motor is started under constant load, includes the utilization of the inherent reduction in the average current in the circuit of alternating current winding of the motor as the speed increases toward synchronizing speed, to automatically effect the connection of the field winding to the direct current source at the desired sub-synchronous speed. And still other methods include the utilization of characteristics of the current, such as average amperage or voltage or frequency, induced in the field winding when the motor is started with the field winding closed, to automatically effect connection of the field winding to the direct current source.

It is known that, during the starting of definite pole synchronous motors of the ordinary commercial types which are started as induction motors having a closed circuit secondary winding, there is a wide variation in the value of the effective current in the circuit of the alternating current winding of the motor, this current initially being, in some cases, approximately seven or eight times as great as full load current under normal operation, and decreasing to approximately 40% to 60% of the initial value as the motor closely reaches 90% to 95% of synchronous speed. And it is also known that, during the starting operation, there is considerable variation in the average power factor of the circuit of the alternating current winding of the motor, the power factor being a minimum at the moment of connecting the alternating current winding to the supply circuit and increasing as the speed rises towards synchronous speed, this average power factor varying from a value of 20% to 50% at the beginning of the starting period, to a value of 30% to 70% at approximately 90% to 95% of synchronous speed, the initial sub-synchronous power factor being subject to considerable variation dependent upon the load under which the motor is started. And, aside from this variation in average power factor during the starting period of the synchronous motor, there is a continuous cyclic variation in the instantaneous value of the power factor of the alternating current circuit, the periodicity of this cyclic variation varying inversely as the slip of the motor, and the amplitude of the cycles increasing to a very substantial extent as the motor speed rises above a value approximating 85% to 90% of synchronous value. This cyclic variation in instantaneous values of power factor of the alternating current circuit of the motor is incident to the passing of the definite polar paths through the field element into and out of alinement with the rotating magnetic field established by the primary or alternating current winding of the motor, and, to a considerable extent, independently of whether the circuit of the direct current field winding is open or closed on itself during the starting period.

The present invention is concerned with the provision of novel controlling apparatus utilizing this cyclic variation or rate of variation of instantaneous values of the relation between voltage and current, or power factor, of an alternating current circuit during periods of abnormal or unusual conditions, for controlling purposes, and it is of particular utility in the control of synchronization of synchronous alternating current motors.

It is an object of the present invention to provide an improved apparatus and system of electrical control capable of controlling the operation of an alternating current synchronous motor and responsive to electrical characteristics of the circuit of the alternating current winding of the motor.

It is a further object of the present invention to provide an improved apparatus and system of electrical control capable of utilizing the cyclic variation of instantaneous values of the relation between voltage and current, or the power factor, of an alternating current supply circuit for a synchronous alternating machine, incident to asynchronous operation thereof, for controlling the synchronization of the machine.

It is a further object of the present invention to provide an improved apparatus and system of control for a synchronous alternating current motor and which is responsive wholly to electrical characteristics of the circuit of the alternating current winding of the motor and capable of utilizing the cyclic variation of power factor of such circuit incident to the motor closely approaching or falling out of synchronous operating condition, for establishing or disestablishing, respectively, normal running conditions of the motor.

The above and other objects and advantages are attained by the present invention, various novel features of which will be apparent from the description herein and the accompanying drawings, disclosing an embodiment of the invention, and will be more particularly pointed out in the claims.

Figure 2:
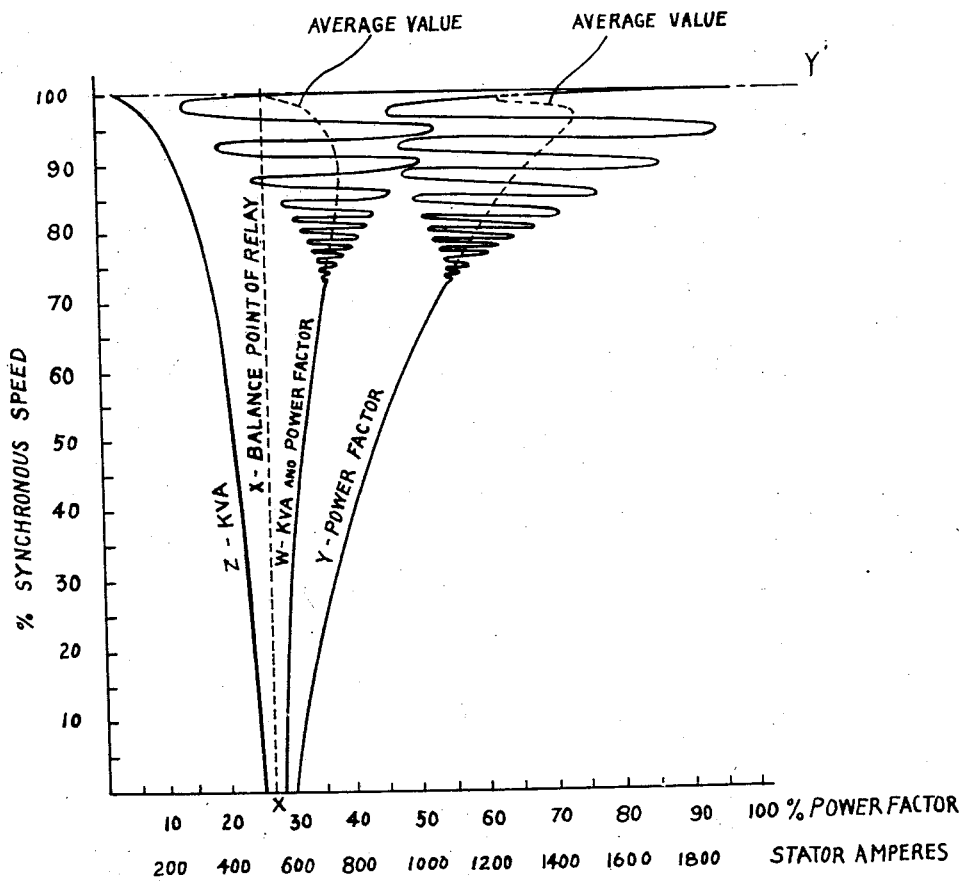

In the accompanying drawings:

Fig. 1 shows in diagrammatic form a system of control for a synchronous motor, embodying features of the present invention; and Fig. 2 is an explanatory diagram of approximate conditions in the circuit of the alternating current element of a synchronous motor during starting thereof.

In the embodiment of the invention illustrated in Fig. 1, a three-phase synchronous motor is indicated at 2, the A. C. winding of the motor being supplied from an A. C. source through a supply line 3, 4, 5, and the connection to the motor being controlled by a three-phase line switch or circuit breaker 6. The D. C. field winding 7 of the motor, usually disposed on the rotor, is supplied from a D. C. source 8, through a line switch 9, a conventional form of rheostat 10 being provided for varying the current in the circuit of the field winding. The rotor is provided with the usual squirrel cage winding at the pole faces of the rotor. The circuit of the field winding may be left open at the double-pole switch 9 during the starting period or, where desirable, the circuit of the field winding may be closed, during the starting period, through a resistor 11 by a normally closed contactor operatively associated with the switch 9.

In order to provide for automatically placing the motor in synchronous operation without further operation beyond closure of the A. C. line switch, the D. C. line switch 9 is automatically operated to closed position at a desired predetermined sub-synchronous speed, corresponding usually to approximately 95% of synchronous speed, by an electromagnet 12, whose energizing winding is closed by a relay device 13 responsive to certain load and power factor conditions existing in the alternating current circuit of the motor when the speed of the latter reaches the predetermined sub-synchronous value. This relay device 13 is shown as including alined similar electromagnets 14, 15, arranged in opposed or differential relation and whose movable cores are connected for simultaneous operation, and a centrally located contact finger 16, attached adjacent one end to an intermediate portion of the connection between the cores of the electromagnets 14, 15. The movable element of the relay device is pivoted at its opposite end on a fixed support, and it is definitely biased to a neutral or intermediate position between and out of engagement with a fixed contact 17 and a fixed stop or contact 18, by means of biasing springs 19, 20.

Electromagnets 14, 15 are provided with energizing windings 21, 23, respectively, connected in series through a conductor 24, in the circuit of the secondary of a current transformer 25 carrying current proportional to that in the phase line 5; and these windings are so disposed on their cores as to produce fluxes which exert opposing effects on the connected cores and the contact finger 16. The source of energization of the windings 21, 23 is a composite one, including the current transformer 25 and a potential transformer 26 across the phase lines 4 and 5, and hence the energization of the windings 14, 15 is dependent on current and voltage characteristics of phase 4, 5 of the supply line. The circuit from the current transformer to the windings 21, 23 has in shunt thereacross a fixed resistance 27 connected in series with the resistance element of a potentiometer type rheostat 28 having an adjusting arm 29. And the secondary of the potential transformer 26 supplies a reduced potential to a transformer 32 whose secondary winding is in a connection from the potentiometer arm 29 to the connection 24 between the adjacent ends of the electromagnet windings 21, 23. The potentiometer rheostat 28 serves as a device for varying, as desired, the speed of the motor at which effective vibrating operation of the relay device 13 is instituted to accomplish synchronizing of the motor.

An adjustable resistance 34 may be included in the circuit of the winding 21 of the electromagnet 14, and through variation of this resistance, it is possible to further adjust the current in the winding 21 with respect to that in winding 23. The circuit of the secondary of the potential transformer 26 is closed by contactor 35 operated to closed and open positions with the switch or circuit breaker 6.

As indicated in the drawings, the contact finger 16 of the relay device 13 is connected to the positive terminal of the control circuit 6a supplied from the D. C. source 8, and when the contact finger is in engagement with the fixed contact 17 of the relay device, an energizing circuit for the electromagnet 12 is established from the positive side of the D. C. control circuit, through contact finger 16, fixed contact 17, a normally closed contactor 37, the winding of the electromagnet 12 and a non-inductive resistance 38 and a variable reactance device 39, to the negative side of the D. C. control circuit. By variation of the inductive effect of the reactance device 39, as through adjustment of a variable resistance 41 in a closed circuit including a winding inductively related to the reactance device 39, the time constant or rate of building up of the current of this circuit may be varied to cause the effective action of the electromagnet 12, in applying direct current to the motor field and interrupting the short circuit through the resistance 11, to occur at such suitable interval after closure of contacts 16, 17, as corresponds to a favorable point in the slip cycle and facilitates pulling of the motor into synchronism.

Operation of the electromagnet 12 causes closing of contactors 43 and 45 along with the switch 9 of the field circuit. Contactor 43, when in closed position, serves to complete an independent energizing circuit for the electromagnet 12, from the positive side of the D. C. control circuit, through the winding of the electromagnet 12, reactance 39 and resistance 38, to the negative side of the D. C. control circuit. Contactor 45 closes the circuit of the energizing winding of an electromagnet 46 which serves, when energized, to open the contactor 37 and thus the initial circuit through the contact 17 and the energizing winding of the electromagnet 12. Energization of the electromagnet 46 may also serve to open a normally closed contactor 47 to remove a normal short circuit about the resistance 48 in the circuit of the energizing winding of the electromagnet 46. The opening movement of contactor 47, on energization of the electromagnet 46, is preferably delayed to a slight extent by a conventional time relay device, as indicated. And energization of the electromagnet 46 also serves to cause closure, with a suitably delayed action, of contactor 51 located in a circuit from the contact 17 of the relay device, this auxiliary circuit by-passing or short circuiting the energizing winding of the electromagnet 12, and hence causing deenergization of such electromagnet. By reason of the time delay in the closure of the contactor 51 and the fact that the contact 16 of the relay device is normally out of engagement with the contact 17 after the motor is synchronized and thereafter engages the contact 17 only in case the motor pulls out of synchronism, the by-pass circuit, through the contactor 51, is effective to short circuit the winding of the electromagnet 12 only on the occurrence of abnormal running conditions.

Actuation of the electromagnet 12 also causes opening of a normally closed contactor 52, to remove a normal short circuit about a resistance 53 in the circuit of the winding 21 of the electromagnet 14 of the relay device 13, thereby reducing the tendency of the relay device toward such operation as causes engagement of the contact finger 16 with fixed contact 17, after the electromagnet 12 has closed the D. C. field switch 9 to effect synchronizing of the motor, and the latter might operate at leading power factor.

The circuit breaker 6, with the auxiliary contactor 35 completing the secondary circuit of the potential transformer 26, when in closed position, is held latched therein in a conventional manner, and a tripping electromagnet 54 is provided for tripping the circuit breaker 6 and the switch 35 to open position. The energizing winding of this tripping magnet may be connected across the secondary of the potential transformer 26 or, as shown, it may be supplied with A. C. line current, the circuit of this energizing winding being closed by a contactor 56, biased to open position, and held closed by an undervoltage relay or magnet 57 whose energizing winding is in a circuit across the terminals of the secondary of the potential transformer 26, beyond the contactor 35. The circuit of the undervoltage magnet 57 preferably includes therein a contactor 58 of an overload relay biased to closed position, the energizing winding of this relay being included in series in the circuit of the current transformer 25.

An auxiliary contactor 61, biased to closed position, may also be included in the circuit of the winding of the under-voltage relay magnet 57, this contactor 61 being actuated under certain conditions by energization of a time delay electromagnet 62 whose energizing winding is completed by a contactor 63, biased to closed position. The energizing winding of the contactor 63 is included in series in the circuit of the field winding of the motor, and it is effective to open the contactor 63 on connection of the field winding to the D. C. source and to hold the contactor open only while the current in such winding remains above a predetermined minimum value. An auxiliary contactor 65, biased to closed position, is actuated to open position by electromagnet 62 in opening the contactor 61, opening of the contactor 65 serving to insert a normally short circuited resistance 67 in the circuit of the energizing winding of the electromagnet 62.

The supply of D. C. energy from the source 8 to the D. C. circuits, particularly the D. C. control circuits, is controlled by a conventional form of contactor or switch which is closed and opened when the A. C. line switch 6 is closed and opened, respectively. Such an auxiliary switch may be actuated separately from the A. C. line switch or circuit breaker, but the operation of such auxiliary switch is preferably coordinated or interlocked, electrically or mechanically, with the operation of such line switch, so as to secure operation of the auxiliary switch to closed and opened positions simultaneously with the line switch. The desired result may be attained by a switch between the D. C. source of supply and the D. C. control circuit 8a; and such a controlling switch of conventional form, indicated at 69, may be separately closed substantially at the same time as the line switch 6 and opened substantially simultaneously with or subsequent to opening of the latter switch. However, as a conventional preferred operating expedient, the auxiliary controlling switch 69 is indicated as being mechanically interlocked with or secured to the line switch 6 or its operating means, to insure closure and opening of the contactor 69 and the line switch 6 substantially simultaneously.

Operation of the relay device 13 to effect desired connection of the field winding 7 of the motor to the D. C. supply and interruption of the short circuit through the field resistance 11 is dependent on the fact that, in the building up of the speed of the motor during the starting operation, the current in the circuit of the A. C. winding of the motor decreases gradually and its average power factor, in addition to undergoing a substantial increase in value, also undergoes a cyclic variation, the frequency of this cyclic variation being twice that of the slip and varying with the frequency of the slip. These cyclic variations are of considerable amplitude when the speed of the motor rises above approximately 85% of synchronous speed and continue to increase in amplitude, while decreasing in frequency, as the speed closely approaches synchronism, and drop to zero as synchronous speed is reached. This cyclic variation in power factor of the circuit of the A. C. winding occurs independently of whether the circuit of the field winding is closed or open, and it is occasioned by the changes in the position of the poles of the field member, during rotation thereof, relative to the rotating magnetic field produced by the stator winding, i. e., the cyclical passing of the magnetic path of the field member into and out of alinement with the rotating magnetic field of the stator.

As the rate of change of the relative positions of the D. C. field poles and the rotating magnetic field of the stator decreases, and hence as the speed of the motor approaches synchronous speed, it will be apparent that there are intervals of increasing duration during which the instantaneous power factor is below and above the average power factor. This characteristic is utilized in securing desired operation of the relay device 13, with its energizing windings 21, 23 subjected to variations in the current and the varying frequency and magnitude of changes in the power factor from average value, to thereby effect the connection of the field winding to the source of direct current at a predetermined motor speed, thus causing the motor to pull into synchronism.

In Fig. 2, curve Y represents approximate variations in the power factor, and curve Z approximate variations in the kilovolt amperes, of the circuit of the stator winding of a conventional synchronous motor of the rotating field type. Curve W, roughly an average of curves Y and Z, represents the resultant effect of varying kva. and power factor and, in its relation to the line X, the effective force acting on the relay 13 during the starting operation of the motor, to hold the contact 16 away from or move it into engagement with contact 17. This line X represents the selected balance point of the relay device 13; and when the curve W is to the right of the line X, the contact 16 is held withdrawn from the contact 17, and when the curve W is to the left of the line X, the contact 16 is moved into engagement with the contact 17. By suitable setting of the adjustable rheostat 28, the balance point of the relay, represented by the line X, may be correspondingly adjusted to secure desired effective vibration of the relay at a point corresponding to a selected high sub-synchronous speed. With the curve W, as it is throughout its greater part, to the right of the line X, the energizing effects of the differential relay are such as to hold the contact finger 16 of the relay in engagement with contact or stop 18.

Until the speed of the motor has risen to approximately 80% of synchronous speed, the frequency and magnitude of the cyclic variations in instantaneous power factor have little effect in varying the power factor component of the effective energization of the cores 14 and 15 of the relay device 13. As the motor speed rises above approximately 80% of synchronous speed, and hence the slip decreases accordingly, the variations in instantaneous power factor become more pronounced, as indicated by the curve Y; and these variations in the power factor produce a correspondingly varying value of effective energization of the cores 14, 15 of the relay device, as indicated by the zigzag upper portion of curve portion W. As the value W drops to points to the left of the line X, the contact finger 16 vibrates in the space between fixed contacts 18 and 17; and at a motor speed corresponding to approximately 90% of synchronous speed, the power factor component of effective energization of the cores 14, 15 fluctuates in a decided manner at a gradually decreasing frequency depending on the slip, causing contact 16 to engage periodically with contact 17, engagement with the latter causing closure of the circuit of the winding of electromagnet 12. The time interval of closure of contact finger 16 with contact 17 becomes increasingly greater as the slip decreases, until, at a point corresponding to approximately 95% of synchronous speed, this period of engagement with contact 17 is of sufficient duration to exceed the time constant of the winding of circuit of the electromagnet 12, this time constant being adjustably predetermined by the rheostat 41 to insure application of direct current to field at a desired sub-synchronous value; and at such point, the electromagnet 12 is actuated to cause the field winding 7 to be connected with the D. C. source 8 and the short circuit through the resistance 11 to be removed.

With the hereinabove explanation of the operation of the relay device 13, in effecting the application of direct current to the field winding, the function of the control system disclosed in Fig. 1, in the control of a synchronous motor, will be more readily apparent. On closure of the circuit breaker 6, and incidental closure of the contactors 35 and 69, the stator winding of the motor is connected to the A. C. line, and the secondary circuit of the potential transformer 26 is closed by auxiliary switch 35, and the D. C. control circuit 8a is connected to the D. C. source 8 by the contactor 69; and the motor starts as an induction motor with its field circuit closed through resistance 11 or, if desired, open at one or more points. Closure of the circuit of the potential transformer 26 completes the circuit through normally closed contacts 58 and 61 to energize the low voltage magnet 57, causing closure of the contactor 56 to thereby establish an energizing circuit for the holding magnet 54 which maintains the line circuit breaker closed.

As the speed of the motor builds up above approximately 90% of synchronous speed, appreciable oscillation of the contact finger 16 of the relay device is present, this oscillation being due to the alternating overpowering effect of electromagnets 14 and 15 of the relay. This oscillation of the contact 16 of the relay is incident to the presence of conditions in the armature circuit corresponding to the upper zigzag portions of the curve W of Fig. 2; and, as the motor speed continues to rise, contact finger 16 periodically engages with contact 17 and establishes an energizing circuit through normally closed contactor 37, energizing winding of electromagnet 12, time delay reactance 39, resistance 38, to the negative side of the direct current supply line. As described hereinabove, when the speed of the motor has risen to approximately 95% of synchronous speed, the electromagnet 12 actuates the switch to connect the field winding 7 to the direct current supply line to pull the motor into synchronism and interrupt the short circuit through the resistance 11.

With field switch 9 closed, the motor is thereupon pulled into synchronism, and the power factor of the A. C. circuit then follows the line Y' to a value above 50%, corresponding to the value of the field current. While the motor remains in synchronism and normal field current is present, the power factor will not return to a 50% lagging value. And with the motor in synchronous operation, and the power factor of the A. C. circuit at any normal value for this operating condition, the effective energization of the relay 13 is such as to withdraw the contact finger 16 from, and hold it out of, engagement with the contact 17. As the power factor may vary considerably, even rising to nearly zero leading, when the motor is in normal synchronous operation, particularly if the machine is not loaded, provision is made, through opening of the contactor 52, for further insuring that the contact 17 will not be closed again during synchronous operation of the motor, by removing the short circuit about the resistance 53 in the circuit of the winding 21 of the relay device, and hence reducing the energizing effect of the latter winding.

If the motor should pull into synchronism without the D. C. field being applied thereto, the power factor will drop to a very low point and remain there, thus leaving contact 17 closed until the D. C. field is applied, and the contactor 63 consequently opened, assuming that the latter occurs within a time interval, predetermined by the setting of the time delay associated with the electromagnet 62, after closure of the line switch 6 and contactor 69, as referred to hereinafter.

Actuation of the electromagnet 12 to close the field switch 9 causes closure of the normally open contactors 43 and 45 and opening of the normally closed contactor 52. Closure of contactor 43 establishes a holding circuit for the winding of electromagnet 12 from the positive D. C. line, and independent of the contactor 37 and relay contacts 16, 17. As described hereinabove, opening of contactor 52 removes a normal short circuit about resistance 53 in the circuit of energizing winding 21 of the relay device 13. And closure of contactor 45 establishes the energizing circuit, through resistance 48, of the winding of the electromagnet 46 which is effective to open contactor 37 immediately and to close contactor 51 and open contactor 47 after a predetermined time interval. Opening of the time delay contactor 47 removes a normal short circuit about resistance 48 in the circuit of the winding of electromagnet 46. With the contactor 51 closed, subsequent engagement of contacts 16 and 17 of the relay device, as will be referred to hereinafter, establishes a short circuit about the energizing winding of the electromagnet 12.

Connection of the field winding 7 to the D. C. circuit 8 completes the circuit of the energizing winding of contactor 63, with consequent opening of the latter and the energizing circuit of time delay electromagnet 62, the latter being adjusted to cause opening of normally closed contactor 61 in the line switch control circuit, including the energizing winding of the low voltage release magnet 57 and normally closed overload responsive contactor 58, a definite time after the line circuit breaker and auxiliary switches 35 and 69 are closed, if the D. C. field current has not been applied to the motor within such definite time, this tripping of the line circuit breaker being accomplished by opening of contactor 56. This opening of the line switch 6, through opening of contactor 61, may also occur in case the current in the D. C. field of the motor, when once applied, should drop to such predetermined value as permits the contactor 63 to drop to closed position and remain there for a predetermined time corresponding to the time delay period of the electromagnet 62.

The actuation of the time delay electromagnet 62 also effects opening of the normal closed contactor 65, to thereby insert a normally short circuited resistance 67 in the circuit of the energizing winding of the electromagnet 62.

The low voltage responsive contactor 57 and the overload responsive contactor 58 are effective at any time, on the occurrence of predetermined conditions in their actuating windings, to cause tripping of the line switch 6 to open position.

With the motor placed in synchronous operation as hereinabove described, it will continue in synchronous operation under normal conditions. However, the apparatus disclosed herein is operative, in the event that the motor should fall out of step or synchronism due to overload or other causes, to remove the D. C. field of the motor, thus permitting it to operate temporarily as an induction motor, and to thereafter automatically resynchronize the motor, if later operating conditions permit the same within a predetermined time after the motor has fallen out of step. If the motor should fall out of synchronous step, the phase angle between current and voltage increases and the power decreases and will reverse as the motor falls one hundred and eighty electrical degrees out of step. As the motor falls out of step, the power factor, instead of following the definite line of average power factor, indicated in Fig. 2, assumes varying instantaneous values such as were present during the latter stages of placing the motor in synchronous operation, and if this out-of-step operation of the motor reaches a degree such that the instantaneous value of the power factor, and hence the resulting effective energization of the electromagnets 14, 15 of the relay device is such that electromagnet 14 predominates, corresponding to a value of W to the left of the line X of Fig. 2, then the contact finger 16 engages contact 17 to immediately establish a by-pass circuit, through closed contactor 51, which short circuits the energizing winding of the electromagnet 12, with consequent deenergization of the latter and opening of the switch 9, to effect disconnection of the field winding of the motor from the direct current source.

Deenergization of the electromagnet 12 reestablishes the control circuits which, as originally described hereinabove, were effective, with the circuit breaker 6 and auxiliary switches 35 and 69 closed, to accomplish the automatic synchronization of the motor; and the motor, under these conditions, tends to operate as an induction motor, at a speed depending upon the load on the motor. If the abnormal load or other condition, which caused desynchronization to occur, persists for a period corresponding to the time delay of electromagnet 62, the circuit of which is closed at this time through contactor 63, then electromagnet 62 opens contactor 61, thus opening the circuit of the winding of the low voltage magnet 57, with consequent opening of contactor 56 and the circuit breaker 6.

However, if the disturbance which caused desynchronization of the motor is of short duration after opening of the field switch 9, and the load on the motor will permit resynchronization in the normal manner, relay device 13 will again function in its normal manner, described hereinabove, to reestablish the D. C. field of the motor before the end of the time delay period in the opening of the contactor 61 by the electromagnet 62, and bring the motor into synchronous operation again in the manner heretofore described.

While the invention including the relay device thereof has been described hereinabove in connection with the starting of a synchronous motor by applying full line voltage directly thereto, it will be apparent that the invention is applicable to starting the motor by initially applying a reduced voltage, through an auto-transformer or similar device, and thereafter, when the motor has reached a predetermined percentage of synchronous speed, applying full voltage to the motor. And the change from starting to full voltage connections of the motor to the A. C. supply line may be in accordance with any known methods, i. e., responsive to speed of the motor or a definite time interval after establishing starting connections; and a relay device of the character of the hereinabove described relay device 13, but preferably calibrated to have a balance point, corresponding to the line X of Fig. 2, and point of initial engagement of the contacts 16 and 17 such as to establish the change-over from starting to running connections at the desired sub-synchronous speed. And by utilizing the first contact engagement of contacts 16, 17 of the relay device to not only change from starting to running connections, but also to automatically recalibrate the circuit windings 21, 23 of the relay device to establish a second range of operation at higher speeds, the same relay device may be of increased range of utility in accomplishing the double function of changing over from starting to running connections and synchronizing the motor.

It will be apparent that, in accordance with the present invention, a single type or size of controlling relay device may, with suitable inherent adjustment of the parts thereof, be effectively and efficiently used in controlling synchronous motors of a wide variety of sizes, for synchronizing the motor at a most favorable point for each particular motor and for pull-out protection therefor.

Although the present invention has been illustrated and described in connection with certain embodiments, it will be apparent that various changes and modifications may be made therein without departing from the spirit of the invention disclosed or defined by the appended claims.

It is claimed and desired to secure by Letters Patent:

1. Controlling apparatus for a synchronous motor having a winding connectable to an alternating current supply circuit and a field winding connectable to a source of direct current, comprising an electromagnetic device including an armature element and energizing windings therefor whose resultant energizing effect is responsive to electrical conditions dependent upon the rate and magnitude of cyclic variations in the power factor of said alternating current circuit when the latter is connected to said motor, a movable contact, a second contact, said movable contact being operable by said armature element into and out of engagement with said second contact in synchronism with cyclic variations of the power factor of said alternating current circuit to a predetermined degree from an average value, a switch for connecting the field winding of said motor to the direct current source to establish synchronous operation of said motor, and means rendered operable through said contacts for actuating said switch to closed position only upon said contacts remaining in engagement for a predetermined time interval corresponding to operation of said motor at a predetermined sub-synchronous speed.

2. Controlling apparatus for a synchronous motor having a winding connectable to an alternating current supply circuit and a field winding connectible to a source of direct current, comprising an electromagnetic device including an armature element and energizing windings therefor whose resultant energizing effect is responsive to electrical conditions dependent upon the rate and magnitude of cyclic variations in the power factor of said alternating current circuit when the latter is connected to said motor, a movable contact, a second contact, said movable contact being operable by said armature element into and out of engagement with said second contact on variation of the power factor of said alternating current circuit to a predetermined degree from an average value, and means rendered operable by said movable contact when in engagement with said second contact for effectively connecting the field winding of said motor to the direct current source to establish synchronous operation of the motor, said means including a device for delaying the connection of said field winding to the direct current source until said contacts are in engagement for a time interval corresponding to a predetermined sub-synchronous speed of operation of said motor.

3. Controlling apparatus for a synchronous motor having a winding connectable to an alternating current supply circuit and a field winding connectable to a source of direct current, comprising an electromagnetic device including an armature element and energizing windings therefor responsive to instantaneous current and voltage conditions dependent upon power factor conditions of said alternating current circuit when the latter is connected to said motor, a movable contact, a second contact, said movable contact being operable by said armature element into and out of engagement with said second contact on cyclic variation of the power factor of said alternating current circuit to a predetermined degree from an average value, and means rendered operable by said movable contact when in engagement with said second contact for effectively connecting the field winding of said motor to the direct current source to establish synchronous operation of the motor, said means including a device for delaying the connection of said field winding to the direct current source until said contacts are in engagement for a time interval corresponding to a predetermined sub-synchronous speed of operation of said motor, said armature element being effective to withdraw said movable contact from engagement with said second contact on attainment of synchronous operation by said motor and to again move said movable contact into engagement with said second contact on said motor falling out of synchronism to cause said means to disconnect the field winding of said motor from the direct current source.

4. Controlling apparatus for a synchronous motor having a winding connectable to an alternating current supply circuit and a field winding connectable to a source of direct current, comprising an electromagnetic device including an armature element and energizing windings therefor responsive to instantaneous current and voltage conditions dependent upon power factor conditions of said alternating current circuit when the latter is connected to said motor, a movable contact element, a second contact element, said movable contact element being operable by said armature element into and out of engagement with said second contact on cyclic variation of the power factor of said alternating current circuit to a predetermined degree from an average value, instrumentalities associated with said electromagnetic device for varying the predetermined point of initial closure of said contacts with respect to the speed of said motor, and means rendered operable by said movable contact element when in engagement with said second contact for effectively connecting the field winding of said machine to the direct current source to establish synchronous operation of the motor, said means including a device for delaying the connection of said field winding to the direct current source until said contacts are in engagement for a time interval corresponding to a predetermined sub-synchronous speed of operation of said motor, said armature element being effective to withdraw said movable contact from engagement with said second contact on attainment of synchronous operation by said motor and to again move said movable contact into engagement with said second contact on said motor falling out of synchronous step to cause said means to disconnect the field winding of said rotor from the direct current source.

5. Controlling apparatus for a synchronous motor having a winding connectable to an alternating current supply circuit and a field winding connectable to a source of direct current, comprising an electromagnetic device including an armature element and energizing windings therefor responsive to electrical conditions dependent upon cyclic variations of the power factor of said alternating current circuit to a predetermined degree from an average value when said motor is connected to said circuit, instrumentalities associated with said electromagnetic device for varying the degree of responsiveness of said device, a circuit controlling element operable by said armature element and freely movable thereby into and out of effective circuit controlling position in synchronism with said cyclic variations of the power factor, and means rendered operable by said circuit controlling element when the latter is held in effective circuit controlling position for a predetermined time interval for effectively connecting the field winding of said motor to the direct current source at a predetermined sub-synchronous speed of the motor to establish synchronous operation thereof and for disconnecting said field winding from the direct current source on the falling of said motor out of synchronous step.

6. Controlling apparatus for a synchronous motor having a winding connectable to an alternating current supply circuit and a field winding connectable to a source of direct current, comprising an electromagnetic device including an armature element and energizing windings therefor responsive to electrical conditions dependent upon the frequency and magnitude of cyclic variations of the power factor of said alternating current circuit to a predetermined degree from an average value during operation of said motor in its upper range of sub-synchronous speeds, a circuit controlling element operable by said armature element and freely movable thereby into and out of effective circuit controlling position in synchronism with said cylic variations of the power factor, and means rendered operable by said circuit controlling element when the latter is held in effective circuit controlling position for a predetermined time interval for effectively connecting the field winding of said motor to the direct current source at a predetermined sub-synchronous speed of the motor to establish synchronous operation thereof and for disconnecting said motor from the direct current source on said machine falling out of synchronous step, and for thereafter reconnecting said field winding to the direct current source to resynchronize said motor in the event that conditions permitting such resynchronization exist within a predetermined time interval after said motor falls out of synchronous step.

7. In combination, a synchronous motor, an alternating current supply circuit for supplying the armature winding of said motor, a direct current supply source for supplying the direct current field winding of said motor, and means for automatically establishing the connection of said field winding to said direct current source when said armature winding is supplied from said alternating current circuit and said motor reaches a predetermined sub-synchronous operating speed, said means comprising an electromagnetically actuated circuit-controlling device having a contact element freely vibrating into and out of circuit-closed position in response to instantaneous values of current and voltage and the phase relation therebetween present in said armature circuit when said motor is operating at sub-synchronous speeds approaching synchronism, and a time-delay device rendered operative on movement of said contact element to circuit-closed position, and said means effecting connection of said field winding to said direct current circuit only after said contact element has been in circuit-closed position for a predetermined time, determined by said time-delay device and corresponding to said predetermined sub-synchronous speed.

8. Controlling apparatus for a synchronous motor having an armature winding connectable to an alternating current supply circuit, and a field winding connectable to a source of direct current, comprising an electromagnetic device including an armature element and energizing windings therefor whose resultant energizing effect is responsive to electrical conditions dependent upon the rate and magnitude of cyclic variations in the current and power factor of said alternating current circuit with the latter connected to said motor, a movable contact, and a second contact, said movable contact being operable by said armature element into and out of engagement with said second contact in response to said cyclic variations of a predetermined degree in the effective resultant energization of said electromagnetic device, and means rendered operable by said movable contact when in engagement with said second contact for effectively connecting the field winding of said motor with said direct current source to establish synchronous operation of said motor, said movable contact being automatically movable to inoperative position upon attainment of synchronous operation of said motor and being thereafter movable into engagement with said second contact upon said motor falling out of synchronous operation to thereby effect disconnection of said field winding from said direct current source.

EDWARD H. STIVENDER.